United States Patent Office 3,582,472
Patented June 1, 1971

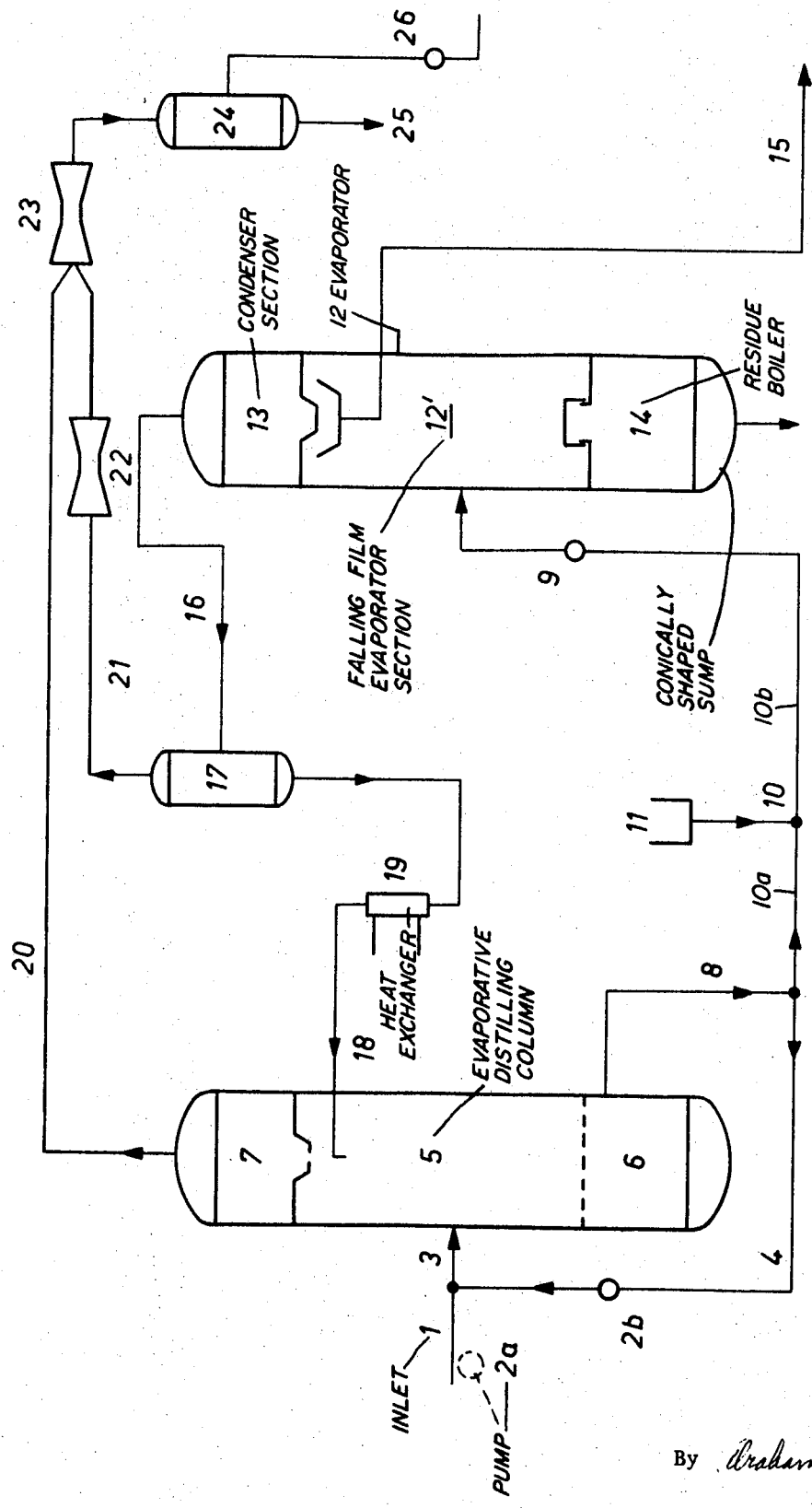

3,582,472
PLURAL STAGE VACUUM DISTILLATION APPARATUS FOR CONTINUOUS PURIFICATION AND CONCENTRATION OF GLYCERINE
Peter Franz, Mumpf, Switzerland, assignor to
Buss AG, Basel, Switzerland
Filed Dec. 11, 1968, Ser. No. 782,878
Claims priority, application Switzerland, Dec. 21, 1967, 18,144/67
Int. Cl. C07c 29/26
U.S. Cl. 202—154
3 Claims

ABSTRACT OF THE DISCLOSURE

The present invention relates to a process for the continuous purification and concentration of glycerine and to an apparatus for the application of this process. In the process crude glycerine is transported under pressure into a recycling evaporative distilling column for concentration and a portion of the concentrated glycerine is treated with an alkaline substance, after which it is processed in an evaporator tower embodying a falling film evaporator and is finally separated off by a condenser in a condition of high purity.

---

When treating the solutions with glycerine content which occur in oils and fats chemistry, it is common knowledge that problems arise in ridding the glycerine of its impurities and concentrating it with as high a degree of conservation as possible, so as to obtain the largest possible yield of glycerine of pharmaceutical purity.

But even the best of the known processes have serious disadvantages that because of high heat requirements and long operating cycles. Superheated injection steam leads to an undesirable decomposition product of glycerine and reduces the yield.

Known processes require complex installations consisting of a large number of columns and auxiliary apparatus interconnected by long connecting pipes. These disadvantages are eliminated by the present invention.

The object of the present invention consists in providing a process and apparatus for treating crude glycerine to recover pure glycerine therefrom by economical and simple means. Crude glycerine is a solution of approximately 88% raw glycerine and 12% water and contains secondary components such as neutral fats, free fatty acids, aldehydes, polycondensates and albumen compounds. Ordinarily, heating causes the formation of undesirable secondary products, such as acrolein and polymerised compounds. Protracted heat treatment causes an increase in viscosity, rise in boiling point and loss of yield of pure glycerine.

The present process and apparatus for the continuous purification and concentration of glycerine is characterised by the fact that a mixture of crude glyercine and concentrated glycerine is fed under pressure into a recycling evaporative distilling column and a portion of the concentrated glycerine is treated with an alkaline substance, sodium hydroxide, for example, after which it is processed in an evaporator and is finally recovered in a condition of high purity. The apparatus comprises a recycling system in combination with an evaporative distilling column and a falling film evaporator which is fed with the concentrated glycerine from the distilling column after it has been chemically treated with an alkaline material.

The process and apparatus are illustrated in attached drawing.

In the apparatus illustrated diagrammatically, 5 denotes an evaporative distilling column comprising an overhead condenser 7 and a gravity fed sump 6. The interior of this evaporative distilling column is provided with helical skimmers of short length which are disposed above the sump 6 and which serve to prevent glycerine droplets from being carried upwardly along with the volatile water component as it evaporates. In contradistinction to conventional designs with filler material, in this case practically no loss of pressure occurs and enables a saving of heat ordinarily used to compensate for the loss of pressure in the evaporative distilling section. The free space of column 5 is operated at reduced pressure which extends over the whole interior as far as the sump. The sump 6 is heated uniformly and continuously by external means, not shown, heating being effected in so gentle a manner that thermal polymerization is not initiated in the glycerine concentrate which trickles down the helical skimmers.

The evaporative distilling column 5 is fed with crude glycerine from the inlet and mixing duct 3 which is connected at one branch by the inlet pipe 1 to the circulating pump 2a, and at the other branch by a recycling pipe 4 to circulating pump 2b, the pumps 2b and 2a proportioning recycled, concentrated glycerine into the inlet pipe 1 along with fresh, crude glycerine.

In addition, the sump 6 is connected by outlet pipe 8 to the recycling pipe 4 at one leg of the recycling system and to pipe 10a leading to chemical treating station 10. Associated with the chemical treating station 10 is a reservoir 11 which continuously introduces an alkaline substance into the chemical feeding station. From the station 10, an outlet pipe 10b transports the chemically treated glycerine through a feed pump 9 to an evaporator 12 comprising a middle section 12' in the form of a falling film evaporator, a residue boiler 15 and conically shaped sump in the bottom section and an overhead condenser 13. The bottom section of the evaporator forming the residue boiler 14 is separated from the falling film evaporator 12' only on the vapour side to thereby eliminate the heat losses and additional piping required in evaporators having separate condenser and boiler units separated by pipes. The pure distilled product collected below condenser section 13 is drawn off through a discharge pipe 15.

Connected to the top of the condenser 7 of the evaporative distilling column 5, the vacuum system comprising outlet pipe 20 which leads to an initial vapour compressor 23 which, in turn, is connected to gravity tube condenser 24, the gravity tube condenser. Comprising a waste water pipe 25 and the connection to the vacuum pump 26.

The vacuum system for the evaporator 12 is connected to the overhead condenser 13 and comprises a connecting line 16 leading to condenser 17 and, through line 21, to vapour compressor 22 which feeds into the first vapour compressor 23 of distilling column 5. Condensate collected from the vapour of condenser section 13 is fed, via a heat exchange 19 and a pipe 18, back to the evaporative distilling column 5.

The process can be carried out as follows: In a continuously operating glycerine/water recycling evaporation installation, approx. 200 kg./hr. of raw glycerine at a concentration of approx. 80–88% with about 12% residual water flow continuously through inlet pipe 1 and maxing duct 3 into the column 5 at a temperature of 60° C. The necessary pressure is provided by the circulating pump 2a. In the mixing duct 3, the crude glycerine is mixed with about 400 kg./hr. of concentrated glycerine (99.5% concentration), the concentrated glycerine being heated to about 165° C. The highly volatile components of mixture evaporate and the droplets of 99.5% concentrated glycerine trickle down the vertical helical skimmers (not shown), which are disposed in the central section of the column, and the concentrated glycerine collects in the sump 6. About 19 kg./hr. of preheated vapour concentrate containing about 95% glycerine and 5% highly volatile components are led into the middle of the column 5 through the pipe 18. The condenser 7 cools and condenses traces of glycerine carried along by the volatile components, so that no glycerine reaches outlet pipe 20. The condenser 7 is effective during the starting up of the plant. The non-condensed vapours from condenser 7 are led away by outlet pipe 20. The sump 6 of the column is heated by approx. 60 kg./hr. of steam at 1280° C., a total of approx. 28,000 k.cal./hr. thus being applied. By means of the feeder pump 9 approx. 588 kg./hr. of hot glycerine concentrate are drawn off through the pipe 8 and a portion of this is sent to the recycling pipe 4, where the circulating pump 2b effects recycling. Another portion of approx. 188 kg./hr. of hot glycerine concentrate is sent to the evaporator 12 and first passes through the chemical treating station 10 where the glycerine is mixed with an alkaline substance, for example NaOH, to absorb the acids and reduce the ester number. It is expedient to continuously add 0.4% NaOH and the mixture is pumped under increased pressure into the falling film evaporator section 12' of the tower. The falling film evaporator section is heated by approx. 90 kg./hr. of steam at 179° C. and at a steam pressure of 10 kg./eq. cm. Section 12' is operated at a reduced pressure of 2 mm. Hg. The glycerine reaches a high purity at the collecting area below the condenser 13 and is drawn off through the pipe 15. The yield is about 86% based upon the quantity of pure glycerine fed in with the raw glycerine. Residues from the evaporator 12 are run continuously into the residue boiler 14, where the glycerine component is constantly evaporated while the residual sludge is continuosly withdrawn from the conically shaped sump.

In the falling film evaporator section 12', a very large film surface area is produced, thus enabling the amount of heat to be reduced and sudden evaporation to be eliminated. The overhead condenser 13 operates in such manner that a certain small proportion of glycerine is withdrawn with the vapours and these vapours are extracted in the vapour condenser 17, heated in heat exchanger 19 and fed into the upper section of the evaporative column 5.

By joining the recycling pipe 4 and the inlet pipe 1, crude glycerine is mixed with hot concentrated glycerine from the lower section of the column 5 and the hot glycerine mixture is introduced into the column so that it is possible to dispense, with a separate pre-heater apparatus, thus reducing the heat requirement and shortening the time for concentration to be completed.

What I claim is:
1. Apparatus for continuous purification of crude glycerine containing water, fats, fatty acids, aldehydes and albumen compounds as impurities comprising:
   (a) an evaporative distilling column (5) having a sump portion (6) at the bottom thereof and a condenser (7) at the top thereof;
   (b) an evaporator (12) comprising an overhead condenser (13), a falling film evaporator section (12'), a residue boiler (14), and a conically shaped sump at the bottom;
   (c) feed inlet means (1, 2a, 3) for forcing crude glycerine in admixture with concentrated glycerine at elevated temperature and under pressure into the evaporative distilling column (5) at a location above the sump (6) thereof;
   (d) a vacuum means connected to the top of said evaporative distilling column (5) and to the top of said evaporator (12), said vacuum means including a first vapour compressor (23) which is connected to said distilling column, and a second vapour compressor (22) which is connected to the top of said evaporator along one branch (16) and to the evaporative section of said distilling column along another branch (18);
   (e) a recycling line (8, 4) connected at one side to the inlet means (1) and fed from the sump (6) for recycling concentrated glycerine into the distilling column (5);
   (f) a chemical purifying means (11, 10) connected at one end (10a) to the outlet of the recycling line (8) for cycling concentrated glycerine from the distilling column (5) to feed into the falling film evaporator section (12') of the evaporator (12); and,
   (g) an outlet line (15) for discharging condensed pure glycerine below the condenser section (13) of the evaporator (12).

2. Apparatus as claimed in claim 1, including a condenser (17) connected to the second vapour compressor and a heat exchanger (19) interposed in the vacuum system between the condenser (17) and the cycling return line (18) to the distilling column (5).

3. Apparatus in accordance with claim 1, characterised by the fact that vacuum pump (26) is connected by a pipe to gravity tube condenser (24).

References Cited

UNITED STATES PATENTS

| | | | |
|---|---|---|---|
| 1,885,166 | 11/1932 | Wurster | 203—26 |
| 2,215,189 | 9/1940 | Peterson | 203—89 |
| 2,266,941 | 12/1941 | Van De Griendt | 203—89 |
| 2,496,576 | 2/1950 | Bradford | 203—18 |
| 2,895,886 | 7/1959 | Schneider | 203—72 |
| 2,977,291 | 3/1961 | Hartmann | 203—37 |
| 3,230,155 | 1/1966 | Schurch | 203—26 |
| 3,428,530 | 2/1969 | Fauche et al. | 203—72 |

FOREIGN PATENTS

| | | | |
|---|---|---|---|
| 900,457 | 7/1962 | Great Britain | 203—72 |
| 1,005,672 | 4/1957 | Germany | 203—18 |

WILBUR L. BASCOMB, Jr., Primary Examiner

U.S. Cl. X.R.

202—205, 236, 155; 203—18, 37, 72, 78, 89; 260—637